(12) United States Patent
McAfee (10) Patent No.: US 6,700,235 B1
(45) Date of Patent: Mar. 2, 2004

(54) ENHANCED COOLING APPARATUS AND METHOD FOR ROTATING MACHINERY

(75) Inventor: David D. McAfee, Ossian, IN (US)

(73) Assignee: Franklin Electric Co., Bluffton, IN (US)

( * ) Notice: Subject to any disclaimer, the term of this patent is extended or adjusted under 35 U.S.C. 154(b) by 0 days.

(21) Appl. No.: 09/691,520

(22) Filed: Oct. 18, 2000

Related U.S. Application Data (60) Provisional application No. 60/163,058, filed on Nov. 2, 1999.

(51) Int. Cl.⁷ .................................................. H02K 9/00
(52) U.S. Cl. ............................. 310/52; 310/58; 310/62
(58) Field of Search .................................. 310/2, 63, 52

(56) References Cited

U.S. PATENT DOCUMENTS

| | | | | |
|---|---|---|---|---|
| 1,267,828 A | | 5/1918 | Wiard | 310/62 |
| 1,479,636 A | | 1/1924 | Wiard | 310/166 |
| 1,996,460 A | * | 4/1935 | Coates | 310/211 |
| 1,998,087 A | | 4/1935 | Koch | 310/62 |
| 2,050,180 A | | 8/1936 | Hurxthal | 310/62 |
| 2,475,560 A | | 7/1949 | Brown | 310/62 |
| 2,778,958 A | * | 1/1957 | Hamm et al. | 310/57 |
| 3,341,113 A | | 9/1967 | Sebok et al. | 417/368 |
| 3,610,975 A | * | 10/1971 | Onjanow | 310/57 |
| 3,643,119 A | | 2/1972 | Lukens | 310/60 R |
| 3,733,150 A | * | 5/1973 | Porter et al. | 415/98 |
| 3,749,953 A | * | 7/1973 | Baumann et al. | 310/62 |
| 4,009,405 A | * | 2/1977 | Gleichman | 310/157 |
| 4,544,855 A | * | 10/1985 | Prenner et al. | 310/59 |
| 4,742,257 A | | 5/1988 | Carpenter | 310/62 |
| 4,908,538 A | | 3/1990 | Geberth | 310/59 |
| 5,081,384 A | * | 1/1992 | Rausch | 310/57 |
| 5,114,317 A | * | 5/1992 | Cohen | 310/62 |
| 5,375,651 A | | 12/1994 | Colwell | 165/47 |
| 5,496,162 A | * | 3/1996 | Schnell | 418/101 |
| 5,519,269 A | * | 5/1996 | Lindberg | 310/58 |
| 5,751,079 A | | 5/1998 | Bagherpour et al. | 310/59 |
| 5,789,833 A | * | 8/1998 | Kinoshita et al. | 310/58 |
| 6,132,182 A | * | 10/2000 | Khan et al. | 417/354 |

* cited by examiner

Primary Examiner—Joseph Waks
(74) Attorney, Agent, or Firm—Marshall, Gerstein & Borun LLP (57) ABSTRACT

A rotating machine has a case with an exterior surface, a pulley end, an opposite end, and an interior working chamber. A rotary shaft is mounted for rotation within the interior working chamber between the pulley end and the opposite end. At least one machine component is supported for rotation on the rotary shaft. At least one air inlet and at least one air outlet are formed through the case. A first fan is supported for rotation on the rotary shaft within the interior of the case and is arranged for pulling air through the air inlet into the interior working chamber of the case and for pushing air out the air outlet from the interior working chamber of the case. A cowl is received over the opposite end of the case. The cowl defines a plenum between an interior surface of the cowl and the case and also defines an annular air opening around a perimeter of the cowl and the case. A second fan is positioned within the plenum wherein the plenum and the second fan are arranged for assisting in moving air through the interior working chamber of the case opposite end and also for pushing air toward the case and exiting the plenum through the annular opening to pass back over the exterior surface of the case.

20 Claims, 8 Drawing Sheets

ENHANCED COOLING APPARATUS AND METHOD FOR ROTATING MACHINERY

RELATED APPLICATION DATA

This application is related to co-pending U.S. provisional patent application Serial No. 60/163,058, which was filed on Nov. 2, 1999.

FIELD OF THE INVENTION

The present invention relates generally to rotating machinery, and more particularly to a method and apparatus for cooling a rotating machine such as an air-cooled motor utilizing a plurality of shaft-mounted fan assemblies adapted to cool the motor interior and exterior case by moving air.

BACKGROUND OF THE INVENTION

Conventional electric motors have a stator section and a rotor section, the latter typically mounted to a central shaft. Although the windings which form the stator section are typically manufactured of a low-resistance material, such as copper wire, the passage of electrical current through the motor windings generates heat. Excessive heat is harmful to non-metallic components of the motor (e.g., electrical insulation, seals and gaskets) and potentially reduces motor life. Moreover, heat will cause metal components to expand, resulting in increased friction and wear and also resulting in reduced motor efficiency and power output. Thus, it is common to equip air-cooled motors with a fan to help dissipate heat to avoid so-called $I^2R$ efficiency losses.

Various single and dual fan arrangements are known in the art for cooling rotary machine components, including electric motor parts. Some arrangements, more preferable air-cooled machines, attempt to exchange the air within the motor case to dissipate heat by convection. Air is circulated over the machine components, draws heat from the components, and delivers the heat to the atmosphere surrounding the machine when exhausted from the machine.

For example, U.S. Pat. No. 4,742,257 discloses a totally enclosed fan cooled induction motor which has a pair of internal fans disposed on opposite ends of the shaft that move air internal to the case. The motor also has an external fan that moves air externally over the internal and external case. The two fans do not cooperate with one another in any manner and do not share air between them.

Geberth Jr., U.S. Pat. No. 4,908,538 discloses a totally enclosed electric motor that utilizes an external fan to move air over an exterior surface of a motor case and an internal fan to move air within the interior of the motor case. Air between the interior and exterior of the motor case does not mix and the two fans do not cooperate with one another in any manner. The interior air flow transfers heat from the machine or motor component to the moving air within the interior and by convection to the exterior case. The air in the interior of the motor is not exchanged.

Bagherpour et al. U.S. Pat. No. 5,751,079 discloses an alternator motor with both internal and external fans. Each of the fans cools separate portions of the motor with no cooperation between the internal and external fans.

Lukens U.S. Pat. 3,643,119 discloses a ventilated dynamo electric machine utilizing two fans to cool components of the machine. A first fan draws air into one end where the air is divided into a plurality of flow paths within the machine case. A separate fan at the opposite end pulls air through the case. Each of the fans is arranged to move air in the same direction and neither of the fans moves air over the exterior of the motor case.

There is a need for an enhanced cooling apparatus and method for rotating machinery such as air-cooled electric motors.

SUMMARY OF THE INVENTION

Objects, features and advantages of the present invention are inherent in the rotary machine and method disclosed in the written description and accompanying drawings provided herein. In one example of the invention, a rotary machine has a case with an exterior surface, a drive end, an opposite end, and an interior working chamber. A rotary shaft is supported for rotation within the case interior chamber between the drive end and the opposite end. At least one machine component is supported on the rotary shaft and rotates along with the shaft. At least one air inlet and at least one air outlet are provided in the case and communicate with the working chamber. A first fan assembly is supported for rotation on the rotary shaft within the case interior and is arranged for moving air through the air inlet into the interior, for moving the air over the at least one machine component, and for moving air out the air outlet from the working chamber. A cowl is mounted adjacent the opposite end of the case and defines a plenum between an interior surface of the cowl and an end surface of the case opposite end. The cowl defines an annular air exhaust opening around a cowl perimeter adjacent the case exterior surface. A second fan assembly is disposed within the plenum whereby the second fan and plenum are arranged for assisting the first fan assembly in moving air out the air outlet and further for moving air toward the end surface of the case opposite end such that the air exits the plenum throughout the annular exhaust opening and passes back over the exterior surface of the case.

In one example of the invention, a method of cooling a rotary machine is provided wherein the machine has a case, a rotary shaft supported within an interior working chamber of the case, and at least one machine component supported for rotation on the rotary shaft in the case interior working chamber. The method includes providing at least one air inlet and providing at least one air outlet each in communication with the working chamber. A first fan assembly is positioned within the interior working chamber and mounted for rotation on the rotary shaft. A second fan assembly is positioned within a plenum mounted exterior to the case adjacent one end of the machine and is mounted for rotation with the rotary shaft. The first fan assembly is arranged for moving air into the case interior via the air inlet, for moving air over the at least one machine component, and for moving air out of the case via the air outlet. The second fan is arranged for moving air back toward an end surface of the case and back over an exterior surface of the case and is also arranged for assisting the first fan assembly in moving air from the case interior via the air outlet. The motor is operated to rotate the rotary shaft which in turn rotates the fans to air-cool the motor during operation by moving air through the working chamber over the at least one machine component and simultaneously moving air over the exterior surface.

Objects, features and advantages of the invention are inherent in the enhanced cooling apparatus and method disclosed and described herein. These and other objects, features and advantages will become apparent upon a review of the written description and the accompanying drawing figures.

BRIEF DESCRIPTION OF THE DRAWINGS

A clearer understanding of the invention can be obtained by reference to the attached drawings that illustrate various examples in which.

DETAILED DESCRIPTION OF THE PREFERRED EMBODIMENTS

Figure 1:
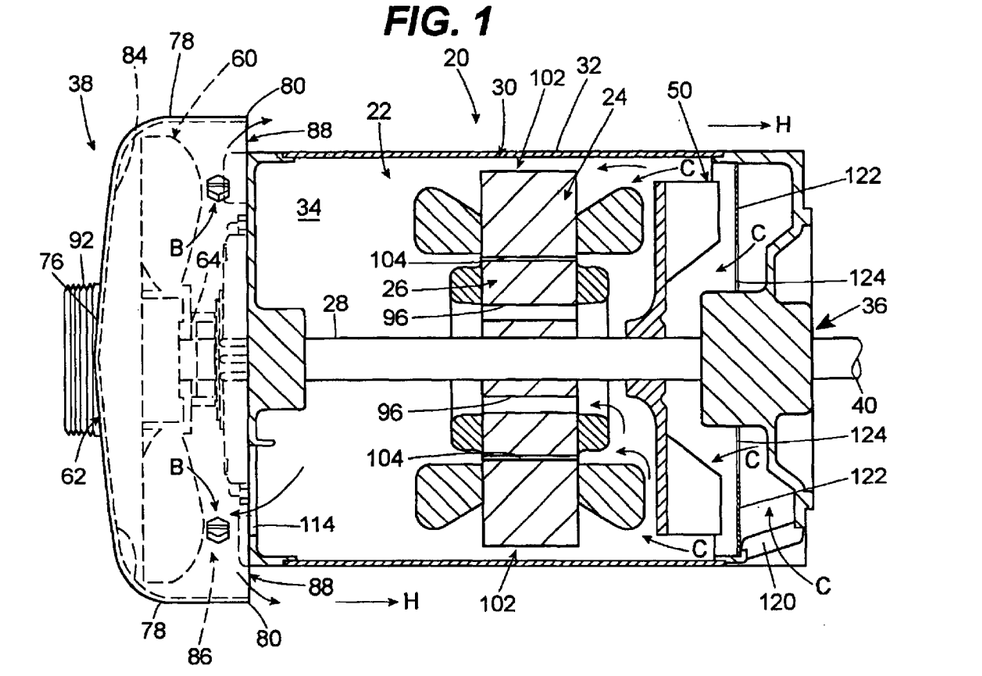
FIG. 1 is a sectional view showing an air-cooled motor equipped with a pair of cooling fans and constructed according to one example of the present invention.

Referring now to the drawings, FIG. 1 illustrates one example of a rotary machine embodying the enhanced cooling apparatus and method according to the teachings of the present invention. In one example, the rotary machine is an air-cooled electric motor 20 having one or more motor or machine components 22 which, in the present example, include an electric motor stator section 24 and a rotor section 26 mounted for rotation on a rotary shaft 28. The stator section 24 and rotor section 26 are housed within a cylindrical casing 30 that has an exterior surface 32 and an interior working chamber 34. As will be evident to those of a ordinary skill in the art, the casing 30 can have virtually any size, shape, and configuration that is feasible for a particular use.

The casing has a drive end 36 and an opposite end 38 generally enclosing the working chamber. The rotary shaft 28 is supported for rotation within the interior working chamber 34 between the drive end 36 and opposite end 38 of the casing 30. A working portion 40 of the rotary shaft 28 extends from the drive end 36 and can be connected to a conventional pulley or other working element as is known in the art, depending upon the particular intended use of the electric motor 20. The machine components 22 include in this example the stator section 24 and the rotor section 26 that is concentrically mounted to the rotary shaft 28 for rotation with the shaft relative to the stator section 24. Suitable bearing assemblies are received in the drive end 36 (not shown) and opposite end 38 (shown below) of the casing 30 to provide support for the rotary shaft 28 and yet permit generally free rotation of the shaft relative to the casing. Suitable seals are also included, when necessary, where the rotary shaft is supported by the casing as is known in the art.

Figure 2A:
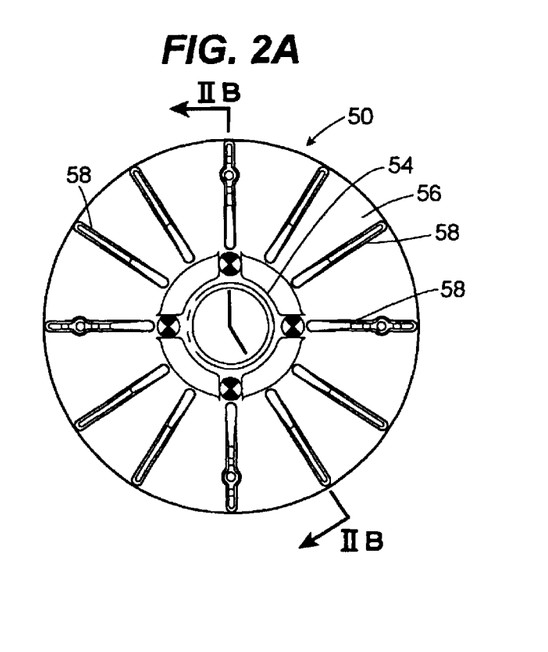
FIG. 2A is a frontal view of one example of an internal fan adapted for mounting to a rotary shaft of the motor of FIG. 1.
Figure 2B:
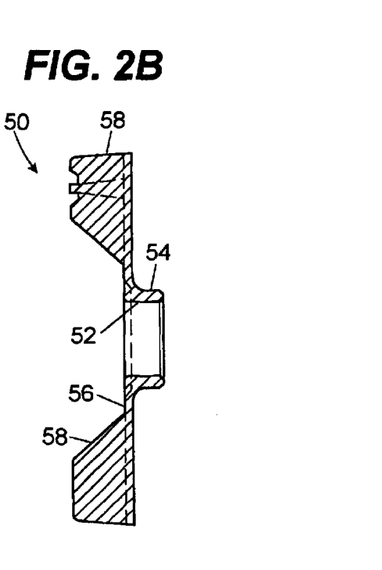
FIG. 2B is a cross section taken along line II B—II B of FIG. 2A of the internal fan.

A first fan assembly or internal fan 50 is mounted in the interior chamber 34 of the casing 30 and rotates with the rotary shaft 28. As shown in FIG. 1, the internal fan 50 is disposed near the machine components 22. However, the internal fan can be positioned virtually anywhere within the interior working chamber 34 of the motor 20 and perform its intended function. One example of an internal fan 50 is illustrated in FIGS. 2A and 2B. The internal fan includes a center opening 52 and hub 54 for being received over and being connected to the rotary shaft 28. The fan 50 also includes a body 56 extending radially from the hub and has a plurality of fins or fan blades 58 extending longitudinally from and normal to the body 56. The particular configuration and arrangement of the fins or blades 58 will determine the characteristic air flow pattern and volume produced by the fan 50 as is known in the art.

Figure 3:
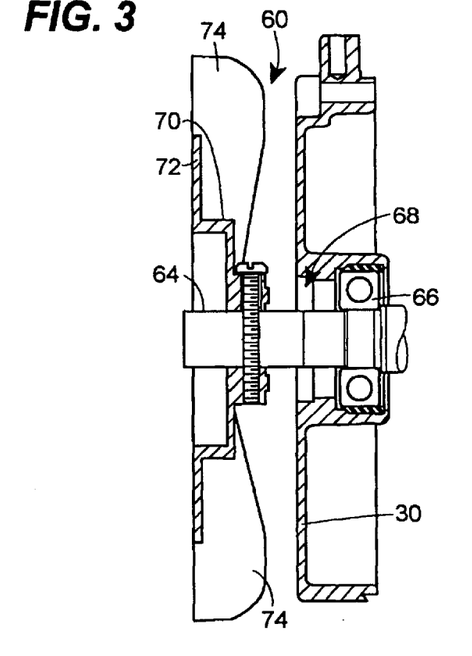
FIG. 3 is a cross partial section of one example of an external fan assembly adapted for mounting to the rotary shaft.

FIG. 1 also illustrates a second fan assembly or external fan 60 in phantom view and housed within a cowl 62 attached or mounted to the opposite end 38 of the casing 30. In this example, the external fan 60 is mounted for rotation on a portion 64 of the rotary shaft 28 extending from the opposite end 38. FIG. 3 illustrates a cross section through the opposite end 38 of the casing 30 including the external fan 60 and the shaft portion 64 (though the cowl is not shown). A bearing assembly 66 as is known in the art is received and supported by the opposite end 38 of the casing for rotationally supporting the shaft 28. An end cap 68 can be included to seal the exposed bearing assembly 66 if desired. Though not shown, the drive end of the shaft 28 can be similarly supported and sealed.

The external fan 60 includes a hub 70 through which the shaft portion 64 extends. The fan 60 also has a body 72 and a plurality of fins or blades 74 extending from the body and/or the hub. Again, the fins or blades 74 are constructed and arranged in order to produce a particular desired or characteristic air flow volume and pattern, which can vary considerably and yet fall within the scope of the present invention.

Figure 4:
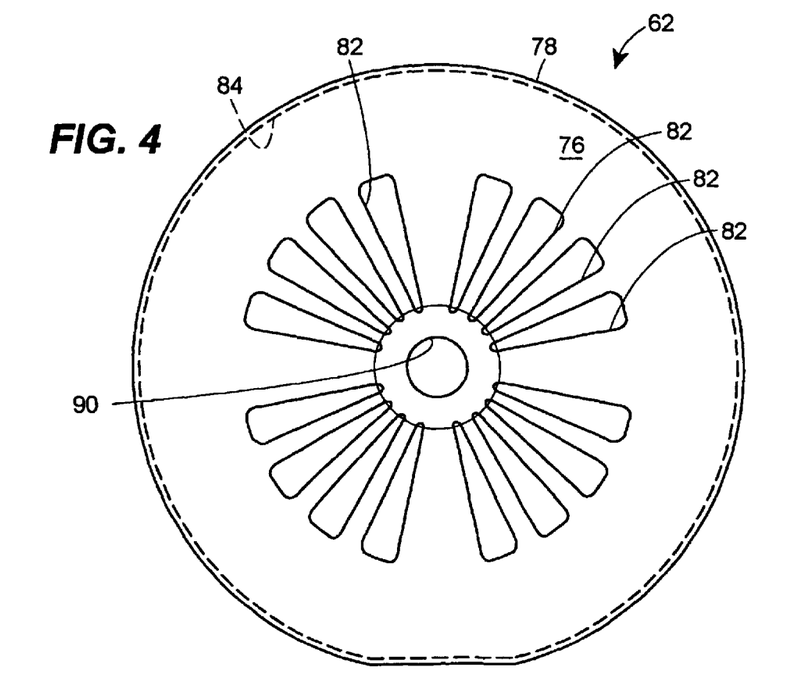
FIG. 4 is an end view of a cowl attached to the casing of the motor of FIG. 1 for housing the external fan therein.

FIG. 4 illustrates an end view of the cowl 62 (shown in side view in FIG. 1) wherein the cowl includes an end wall 76, an annular perimeter wall 78 and a perimeter edge 80. The end wall 76 in one example is provided with a plurality of openings 82 passing through the cowl permitting exterior air to enter the cowl. The cowl 62 also has an interior surface 84 that faces the opposite end 38 of the casing 30. An air plenum 86 is defined between the interior surface 84 of the cowl and the case opposite end 38. As best illustrated in FIG. 1, an annular perimeter exhaust opening 88 is defined between the perimeter edge 80 of the cowl 62 and the opposite end 38 and exterior surface 32 of the casing 30 by a gap existing between the casing and cowl components. The significance of the plenum 86, exhaust opening 88, and the openings 82 are discussed in greater detail below.

Also as illustrated in FIG. 4, the cowl 62 can include an opening or inlet port 90 formed in the end wall 76 of cowl 62, As illustrated in FIG. 1, the cowl opening 90 can include an optional air duct 92 attached to the cowl 62 in order to deliver air from a remote source directly to the cowl inlet port. In one example, the duct 92 is a flexible hose that can be manipulated and re-shaped to deliver air from the source (not shown) to the cowl inlet port 90. The openings 82 and the inlet port 90 can be used together or as alternatives to provide air to the plenum and the external fan.

Figure 5A:
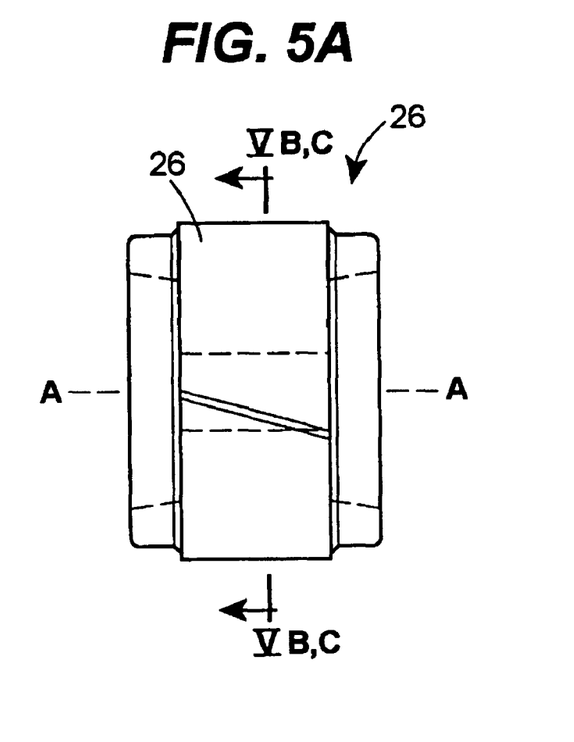
FIG. 5A is a side view showing one example of a rotor section suitable for the motor shown and described herein and shown with the stator section removed.
Figure 5B:
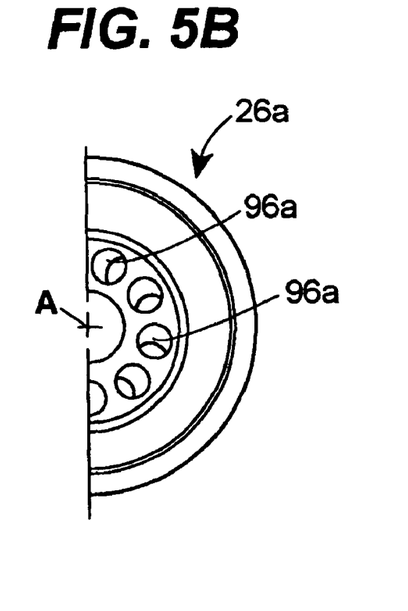
FIG. 5B is a partial cross section taken along line VB—VB of the rotor section shown in FIG. 5A and illustrating one rotor internal construction.
Figure 5C:
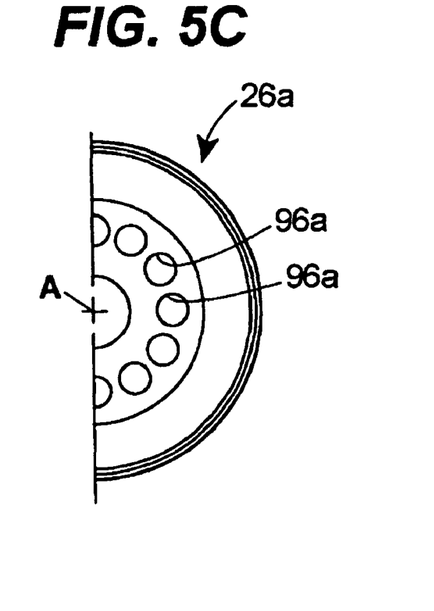
FIG. 5C is a partial cross section taken along line VC—VC of the rotor section shown in FIG. 5A and illustrating one alternative rotor internal construction.

FIG. 5A illustrates a side view of only the rotor section 26 of the machine components 22. In one example, the rotor section 26 has a longitudinal axis of rotation A and a rotor body 94. The body 94 is constructed as is known in the art but can also include a plurality of openings 96 as shown in FIG. 5B formed through the body from one end to the other in a generally longitudinal direction relative to the axis A. The openings 96 permit air to flow through the rotor section 26 to facilitate air-cooling of the machine components 22. FIG. 5B illustrates a preferred example of a rotor 26 with the plurality of openings skewed relative to the axis. By altering the arrangement of the openings 96, particular air flow patterns can be achieved which assist in cooling of the rotor section and other machine components. In addition, the surface area within the openings that contacts moving air can be increased or decreased by changing characteristics of the skewed openings 96 or by providing or other opening arrangements. FIG. 5C shows an alternative construction including openings 96a that are arranged parallel to the axis A of the rotor section 26a.

FIGS. 1 and 6–14 illustrate a number of examples of air flow patterns and paths within a rotary machine such as the electric motor 20 in order to cool the machine components 22 operating within the casing 30. In each of these embodiments, the external fan 60 is not shown but is constructed as previously described including the fan 60 and cowl 62. In each of these figures, the arrows B indicate air flow generated by the external fan 60. Also, the internal fan 50 moves air in a direction indicated by the arrows C in each of these figures.

Figure 6:
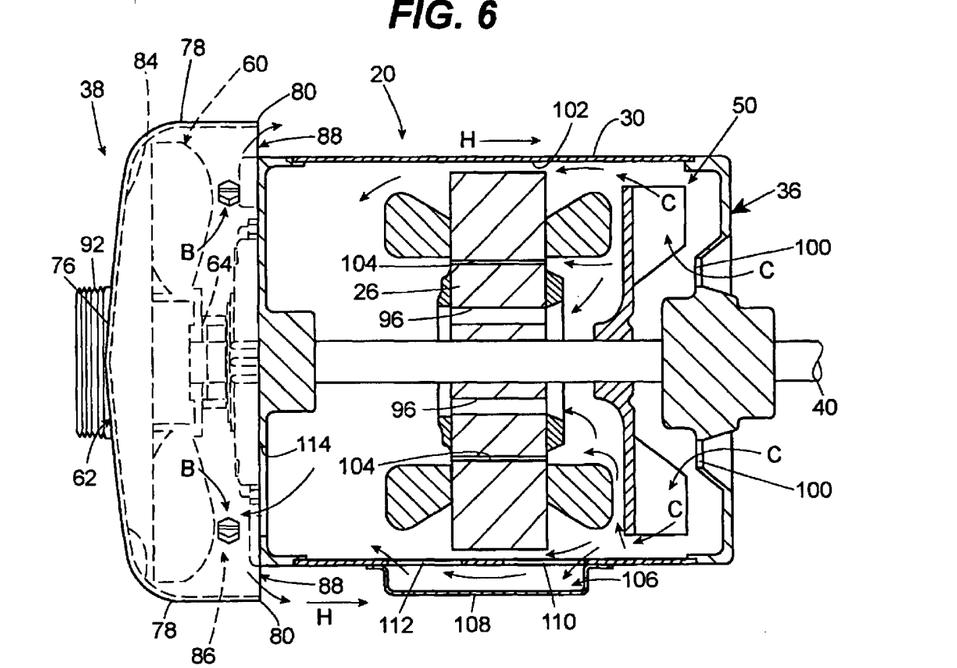
FIGS. 6–15 each show a cross section of an alternative electric motor constructed according to the teachings of the present invention and each depicting a different air flow path through the motor interior.

In the example illustrated in FIG. 6, the electric motor 20 includes one or more air inlets 100 formed in the casing 30 in the drive end 36. The internal fan 50 is arranged to move air from the drive end 36 to the opposite end 38 of the casing 30. A small interrupted or intermittent annular gap 102 is provided between the casing 30 and the perimeter of the motor components 22 that permits air to pass between the casing 30 and the motor components. The openings or passages 96 in the rotor section 26 permit air to also circulate through the rotor section. One or more spaces 104 extending longitudinally through the motor components 22 can also be provided to circulate air between the rotor section 26 and the stator section 24 whereby the spaces 104 are created when assembling the rotor and stator sections.

In the example of FIG. 6, the casing 30 has at least one external cavity 106 carried on a portion of the casing 30. The cavity is defined by a casing extension 108 extending from but attached to the casing. At least a first exhaust port 110 and inlet port 112 are formed through the casing 30 and communicate with the cavity 106. The cavity 106 permits air to freely flow around the motor components 22 via the exhaust port 110 and the inlet 112 from one side of the interior chamber 34 to the other within the casing 30. By passing some of the air into the cavity 106, this air can be cooled somewhat when passing through the cavity and therefore can withdraw more heat by convection from the chamber 34 when re-entering the chamber through the inlet port 112 from the cavity. The cavity 106 will also increase the volume of the air moving through the motor from the drive end to the opposite end. This increased volume of air provides for more cooling.

The casing 30 also includes at least one air outlet 114 communicating between the interior chamber 34 of the casing and the plenum 86 of the cowl 62. Air passes from the interior working chamber 34 of the casing into the plenum 86 via the one or more air outlet 114.

When operating the air cooled electric motor 20 illustrated in FIG. 6, air is drawn into the casing 30 through the air inlet 100 by the internal fan 50. Rotation of the internal fan 50 circulates air through the interior chamber 34 of the casing and over the machine components 22. During operation, the machine components generate heat which is dissipated to the air moving through the chamber. The air circulates between the motor components 22 and casing 30 through the gap 102, through the spaces 104 between the rotor section and stator section, through the air passages 96 in the rotor section, and also through the cavity 106 of the extension 108. As the air passes over the machine components, heat is dissipated to the moving air which then exits the casing through the air outlet or port 114. In this example, the internal fan moves air from the drive end toward the opposite end of the casing.

Air is also moved in a direction from the opposite end 38 toward the drive end 36 of the electric motor 20 by the external fan 60 in the direction of the arrows B. The internal fan 50 generates a positive air pressure exiting the outlet 114. Air moving in the direction of the arrows B generated by the external fan 60 passes over the outlet 114 enhancing a pressure differential thereat as the air moves toward the cowl exhaust opening 88, and thus assisting the internal fan 50. Thus, air moved within the plenum 86 by the external fan 60 and the air exiting the casing through the outlet 114 is pushed out the annular opening 88 of the cowl 62. This air movement is identified by the arrows H shown in FIG. 6 and passes over the exterior surface 32 of the casing 30. This moving air H further dissipates heat from the electric motor 20 by convection as heat is transferred from the warm electric motor casing to the cooler air passing over the casing. The air flow moved by the internal fan through the casing 30 in this example is therefore enhanced by the external fan, though the external fan blows in a direction opposite the internal fan 50.

In the example of FIG. 1, the electric motor 20 has a series of air inlets 120 and a baffle 122 disposed between the drive end 36 of the electric motor and the internal fan 50. The baffle 122 includes a single or a plurality of air passages 124 arranged to evenly distribute air entering the casing 30. As shown in this example, air is moved in a direction from the drive end 36 toward the opposite end 38 of the casing 30 by the internal fan 50. Air is free to flow through the passages 96 in the rotor section 26, through the spaces 104 between the rotor section and stator section 24, and through the gap 102 between the machine components and the casing. In this example, the air dissipates heat from the machine components 22 and exits the casing 30 through the air outlet 114 that is essentially identical to that described for the example in FIG. 6. Again, the heated air exits the outlet 114 into the plenum 86. The external fan 60 moves air toward the drive end 36 of the casing, but because of the pressure differential at the outlet 114, air exits the plenum 86 at the annular opening 88 and then passes over the exterior surface 32 of the casing 30 in the direction of the arrows H. The external fan 60 also assists in pulling air from the casing, as in the example of FIG. 6. The baffle 122 and the position of the air inlets 120 are different than that described above for the example of FIG. 6. In addition, the cavity 106 of the example in FIG. 6 is not utilized in the example of FIG. 1.

Figure 7:
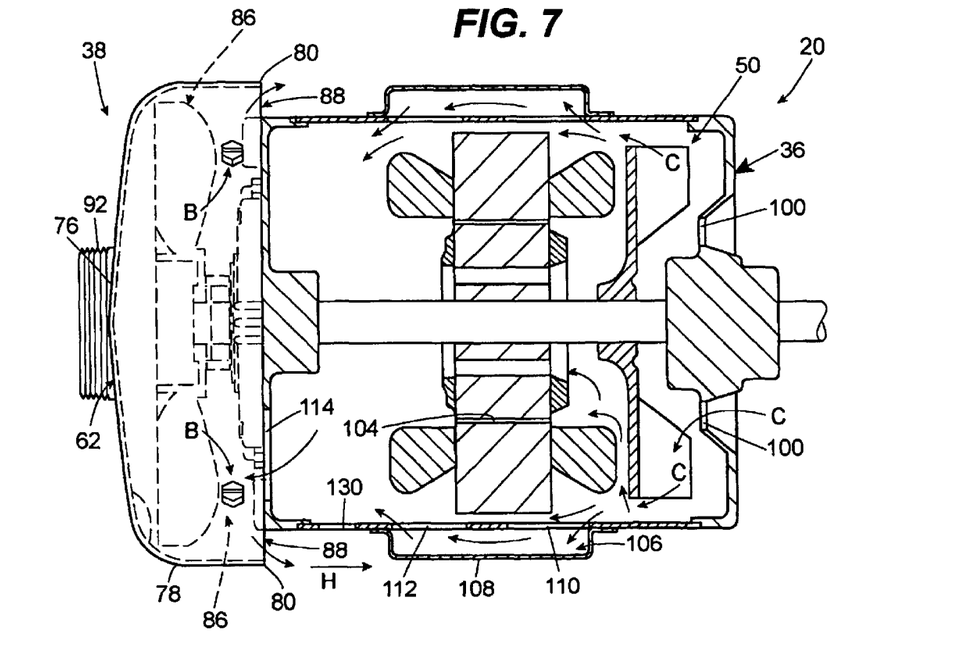

FIG. 7 illustrates another alternative example of an electric motor 20 constructed according to the teachings of the present invention. This example is similar to that described above for FIG. 6 except for two significant differences. First, the casing 30 is provided with one or more supplemental air outlets 130 permitting air to exit the interior chamber 34 of the electric motor before reaching the opposite end 38. One or more of these supplemental air outlets 130 can be provided, although only one is shown in the example of FIG. 7. A second cavity 106 formed by a second housing extension 108 is also illustrated in this example. A second outlet port 110 and second inlet port 112 communicate with the second cavity.

As exemplified in FIG. 7, a plurality of two or more of these cavities 106 can be provided around the circumference of the electric motor 20. As an alternative construction, and as exemplified in FIG. 7, housing extension 108 can also be a continuous annular extension 108 forming a continuous annular cavity 106 extending around the circumference of the electric motor. In such a construction, the outlet ports 110 and inlet ports 112 can be provided either as nearly continuous annular openings extending around the circumference of the casing 30 or as a plurality of separate, smaller openings disposed around the circumference.

During operation, air is drawn into the air inlets 100 by the internal fan 50 and moved through the interior chamber 34 via the rotor passages 96, the machine component spaces 104, and the gap 102 between the machine components and the casing 30. The air also moves through the two or more cavities 106 to increase air flow and to further dissipate heat prior to exiting the interior chamber 34 through the air outlets 114 and 130. The external fan 50 moves air in the direction of the arrows B over each of the air outlets 114 and 130 and creates a pressure differential at the outlets to also assist in moving air through the interior chamber and over the exterior surface of the housing in the direction of the arrows H. Air exiting the exhaust opening 88 will create a pressure differential at the supplemental opening or openings 130 to further assist the internal fan 50 in moving heat out of the working chamber.

Figure 8:
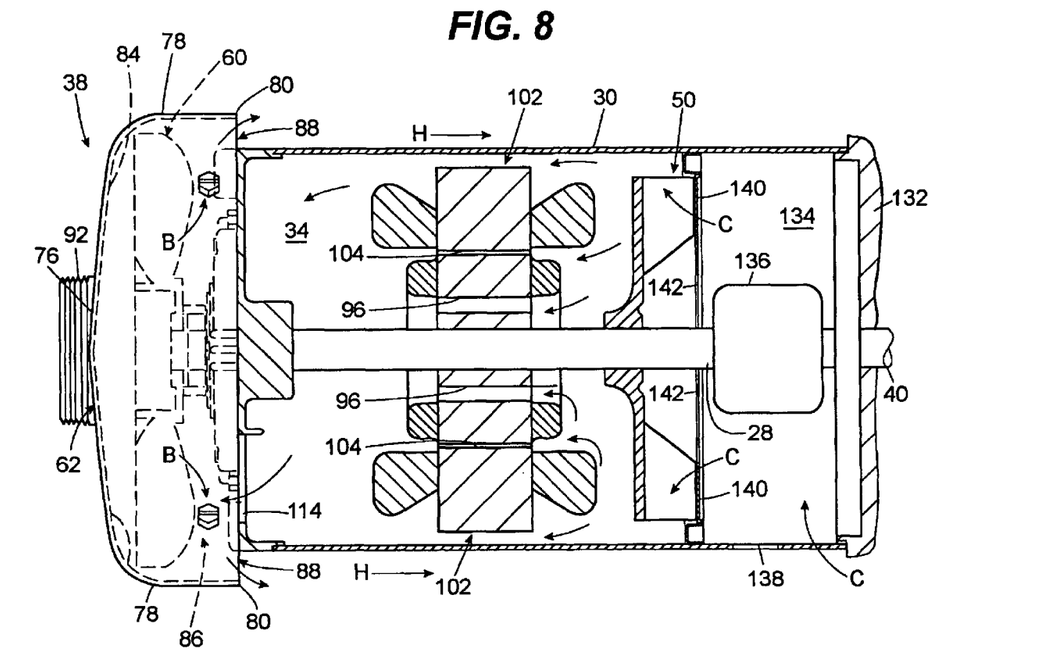

FIG. 8 illustrates another alternative example of an electric motor 20 constructed according to the teachings of the present invention. In this example, the casing 30 is attached directly to a separate machine element 132 with the shaft portion 40 extending into the element to perform its intended function. In this example, the drive end 36 of the casing 30 defines an inlet chamber 134 supporting a counter-weight balance 136 on the rotary shaft 28. The casing includes one or more air inlets 138 communicating with the inlet chamber 134. The internal fan 50 is positioned adjacent the inlet chamber 134 and draws air from the chamber into the interior working chamber 34 of the casing 30 through a baffle plate 140 separating the internal fan and the inlet chamber 134. The baffle plate 140 includes one or more baffle passages 142 through the plate. Air is moved through the rotor passages 96, the machine component space 104, and the gap 102 between the machine components and the casing. In this example, as in the example of FIG. 1, the gap 102 is shown as being somewhat larger than the gap 102 of FIGS. 6 and 7 to permit more air to pass through the gap. Air is again delivered from the interior chamber 34 of the casing 30 through the outlet port 114 and into the plenum 86. A pressure differential from the moving air B created by the external fan 60 at the air outlets and the air H, including some of the air B and the air C is again passed back over the exterior surface 32 of the casing by the external fan.

Figure 9:
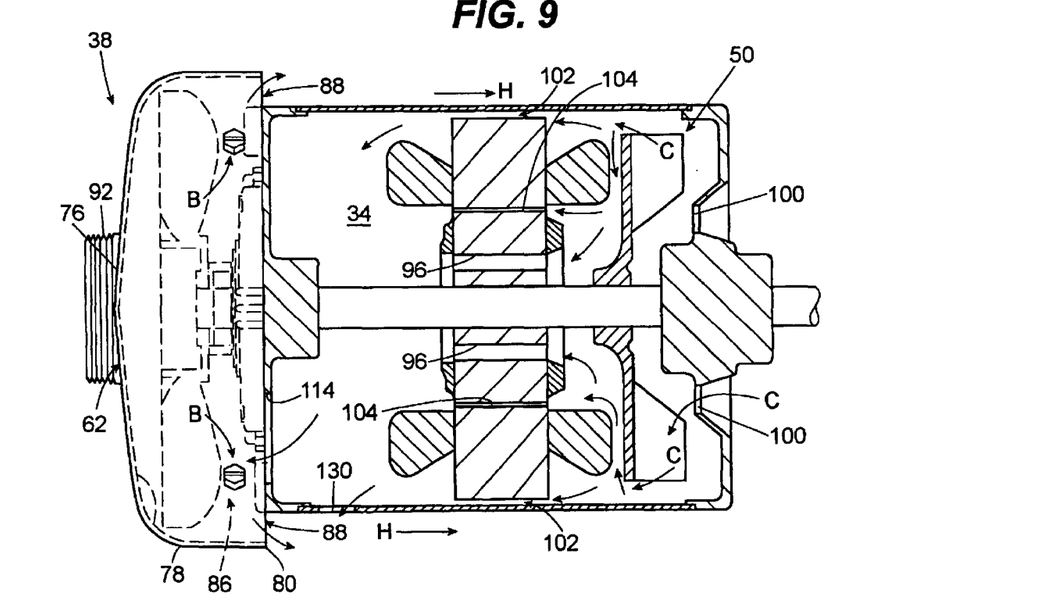

FIG. 9 illustrates another alternative example of an electric motor 20 constructed according to the teachings of the present invention. This example is similar to that illustrated in FIG. 7 except that no exterior cavities 106 are provided on the casing 30. Air is simply drawn into the one or more air inlets 100 by the internal fan 50 and is passed through the interior chamber 34 of the casing through the rotor passages 96, spaces 104, and gap 102 as described above. Air exits the chamber through the one or more outlets 114 and the supplemental air outlet 130. Air C exiting the outlets 114 passes into the plenum 86 and is moved toward the annular opening 88 by the air B back over the exterior surface 32 of the casing in the direction of the arrows H. The moving air B assists in drawing air through the working chamber 34 of the casing. The moving air H assists in doing the same, but through the outlets 130 as described above.

Figure 10:
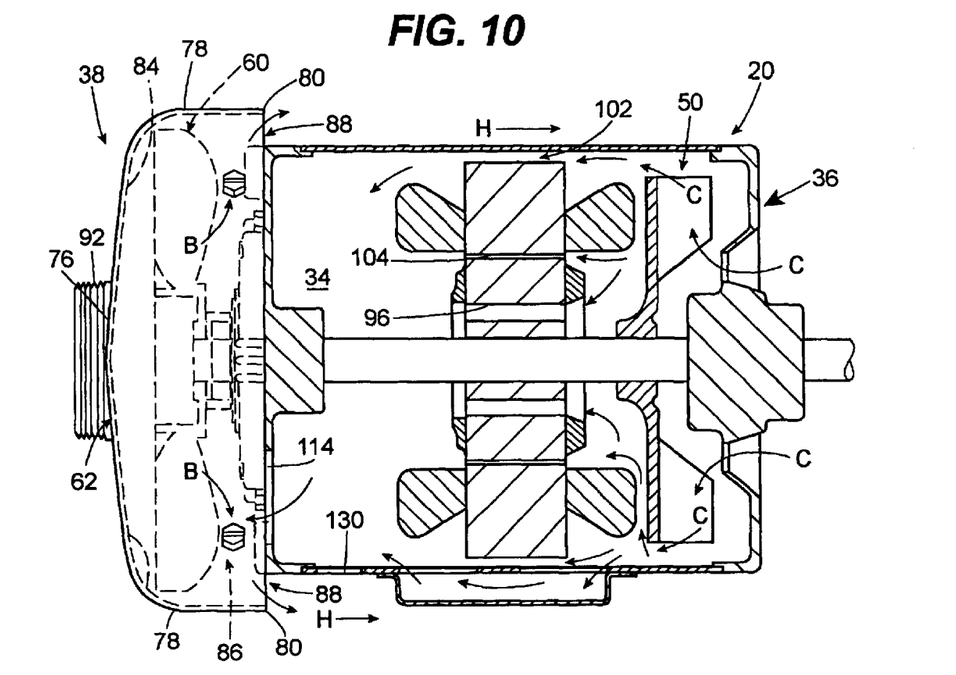

FIG. 10 illustrates another alternative example of an electric motor 20 constructed in accordance with the teachings of the present invention. In this example, the electric motor 20 is constructed essentially identical to that shown in FIG. 6 except that it includes the one or more of the supplemental air outlets 130. The electric motor shown in FIG. 10 functions essentially identical to that described above for FIG. 6 except that some of the air exits the casing 30 through the supplemental air outlets 130 prior to entering the plenum 86 of the external fan 60 and cowl 62. This flow path is similar to that for the motor of FIG. 9.

Figure 11:
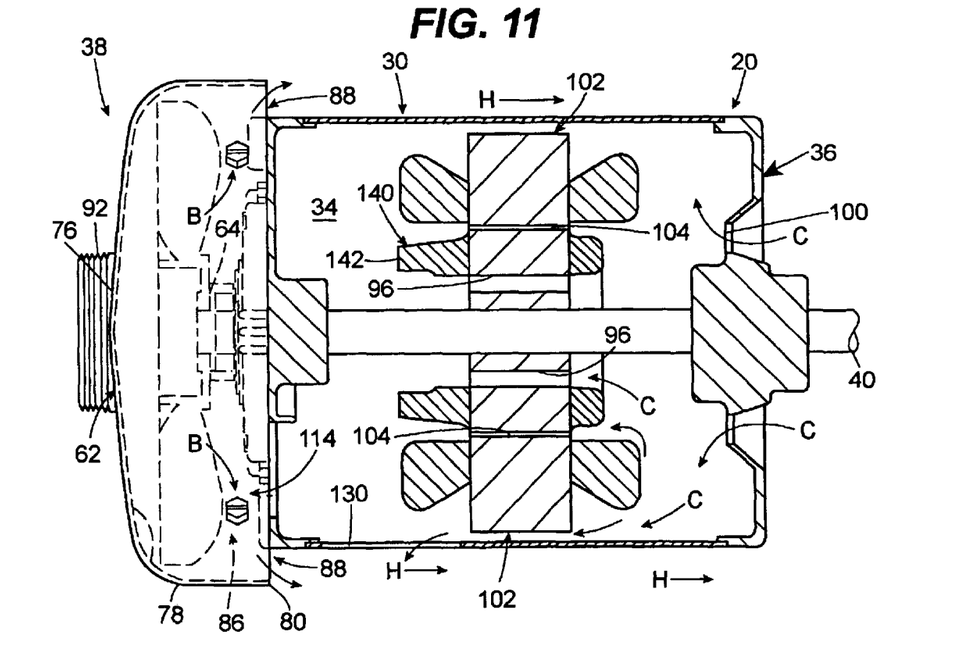

FIG. 11 illustrates another alternative example of an electric motor, 20 constructed according to the teachings of the present invention that has a different internal fan. In this example, the internal fan is in the form of a plurality of rotor fins 140 carried directly by the rotor section 26. The fins 140 are arranged near the rotor core to draw air from the air inlets 100 at the drive end 36 of the casing through the rotor passages 96. Air is moved through the spaces 104 and the interrupted or intermittent gap 102 only by action of the external fan 60. The air is moved toward the opposite end 38 by the fins 140 and the external fan 60 such that it exits both the supplemental air outlets 130 and the air outlets 114 in the opposite end 38.

Figure 12:
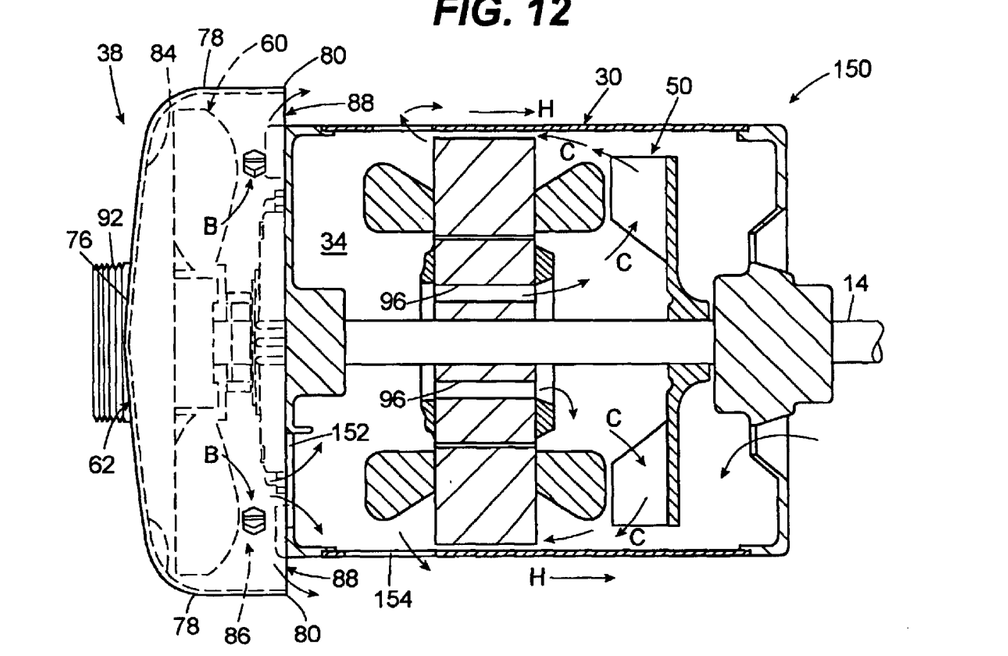
Figure 13:
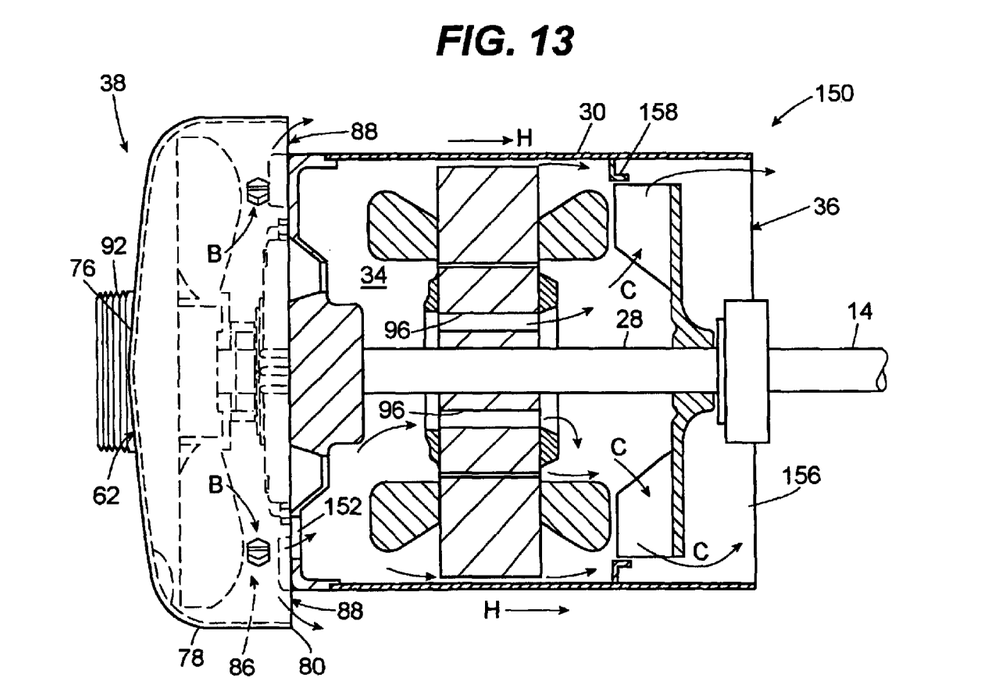
Figure 14:
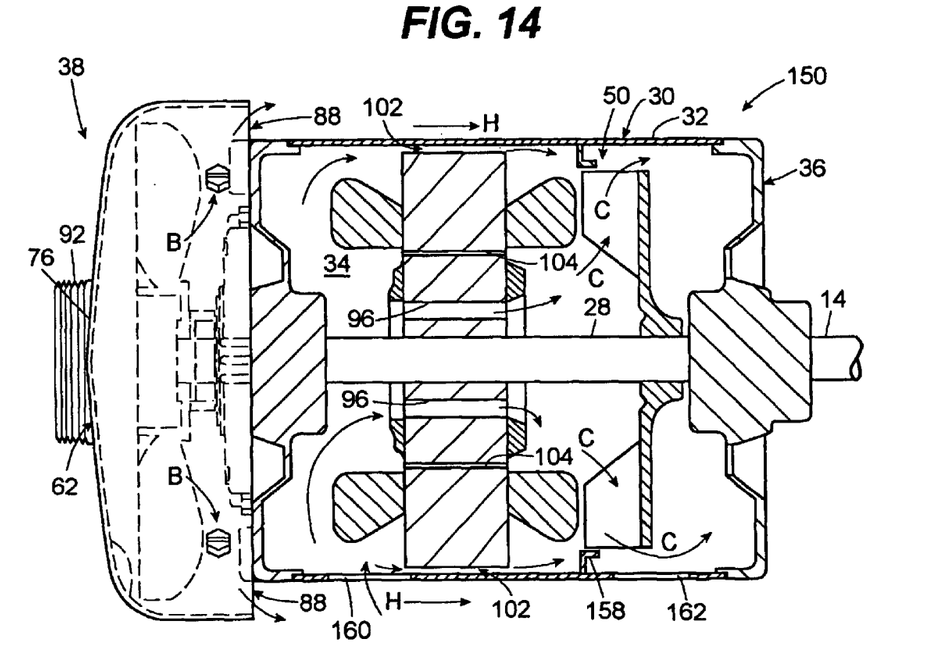

FIGS. 12, 13, and 14 illustrate alternative embodiments of an electric motor 150 that each include an internal fan 50 arranged to move air in a direction from the opposite end 38 toward the drive end 36 of the casing 30, or opposite the direction of the previous examples. FIG. 12 illustrates one example of an electric motor 150 constructed according to the teachings of the present invention. The internal fan 50 is arranged to draw air through the interior working chamber 34 from the opposite end 38 toward the drive end 36. Air enters the case 30 through one or more inlet ports 152 formed in the opposite end 38. One or more outlet ports 154 are also provided in the case near the opposite end 38. The external fan 60 is again arranged adjacent the opposite end 38 and moves air toward the case in the direction of the arrows B. In this example, the drive end 36 of the case, including the internal fan 50 provides no air outlet. Therefore, the external fan 60 moves air both into the working chamber 34 through the inlet port 152 in the opposite end 38 and also moves some air within the plenum through the exhaust opening 88 of the cowl. This air moves in the direction of the arrows H along the exterior surface 32 of the case 30. Air entering the interior chamber 34 circulates through the rotor passages 96 and spaces 104 between the rotor and stator sections of the machine components 22. The air is then moved by the internal fan 50 toward the case interior surface and passes through the gap 102 between the stator section 24 and the case 30 back toward the opposite end 38. The air then exits the outlet port 154 and is accelerated by the air stream traveling in the direction of the arrows H also along the exterior surface of the case. In this example, some air enters the inlet port 152 and exits directly the outlet port 154 and some air entering the inlet port passes over the machine components 122. Both the external fan 60 and the internal fan 50 are moving air in series in this example and are moving air in the same direction relative to one another. In the prior examples, based on air pressure differentials, the fans moved air in series based upon pressure differential at the various air outlets, but they moved or pushed air in opposite directions.

FIG. 13 illustrates another example of an electric motor 150 constructed according to the teachings of the present invention. The electric motor 150 in this example is supported at the drive end by the machine element 132, similar to the motor of FIG. 8. The electric motor 150 in this example includes the one or more inlet ports 152 as described for FIG. 12 permitting air to enter the interior chamber 34 of the case 30. The drive end 36 of the electric motor 150 defines an outlet port 156 which in this example is virtually the entire drive end. The internal fan 50 in this example draws air from the opposite end 38 toward the drive end 36. Air enters the one or more inlet ports 152 and passes through the rotor passages 96, the machine components spaces 104 and the gap 102. An annular flange or baffle 158 is disposed between the machine components 22 and the internal fan 50 so that air flows away from the interior surface of the case 30 prior to exiting the case. The baffle flange 158 creates some turbulent flow conditions for assisting in moving air and dissipating heat throughout the working chamber prior to exiting the case. In this example, some of the air identified by the arrows B and moved by the exterior fan 60 flows into the one or more inlet ports 152 and some of the air flows through the exhaust opening 88 of the cowl 62 such that it passes over the exterior surface 32 of the case 30 in the direction of the arrows H.

FIG. 14 illustrates another alternative example of an electric motor 150 constructed according to the teachings of the present invention. In this example, the electric motor 150 includes one or more inlet ports 160 formed in the case near, but spaced from, the opposite end 38. One or more outlet ports 162 are provided in the case near, but spaced from, the drive end 36 of the case. The internal fan 50 is again arranged to draw air from the opposite end 38 toward the drive end 36 and arranged for moving air in the same direction as the external fan 60. Rotation of the internal fan 50 draws air through the one or more inlet ports 160 wherein the air travels through the passages 96 in the rotor, the spaces 104 between the rotor and stator, and the gap 102 between the machine components and the case. The air passes around an annular baffle flange 158 and then between the fan 50 and the case 30 before exiting the case through the one or more outlet ports 162. In this example, the external fan 60 moves air in the direction of the arrows B which passes from the plenum 86 in the cowl 62 through the annular opening 88 and over the exterior surface 32 of the case 30. A pressure differential is created at the inlet port or ports 160 by the internal fan whereby some of the air traveling in the direction of the arrows H enters the inlet ports along with additional atmospheric air external to the case. In this example, both of the internal and external fans move air in the same direction and operate in series to increase the heat dissipating deficiency of the air cooled rotary machine.

In each of the disclosed examples herein, the internal and external fans operate in series to move air through the interior chamber 34 of the rotary machine to dissipate heat from the machine components 22. In addition, the external fan moves air in such a manner that some air exits an exhaust of a cowl attached to the rotary machine and passes over the exterior surface of the machine case to further dissipate heat from the machine. In some of these examples, though the two fans operate in series, the fans actually move air in opposite directions. In other of these examples, the fans operate in series and move air in the same direction. However, in each example described herein, air is moved within the interior chamber of the case to pass over the machine components and is also moved over the exterior surface of the machine to dissipate additional heat from the machine.

Figure 15:
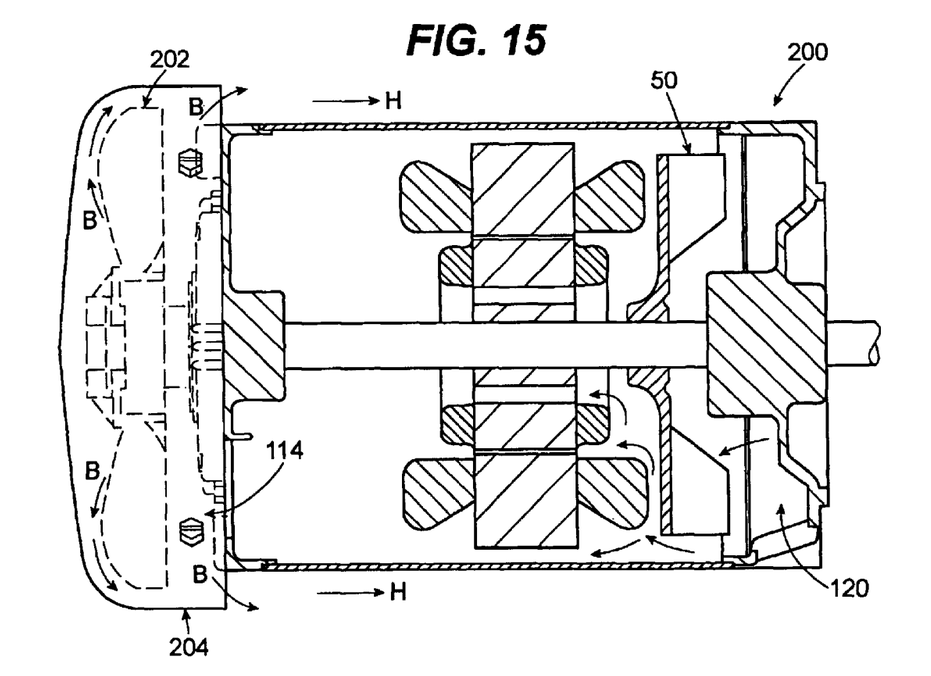

FIG. 15 illustrates another alternative example of an electric motor 200 constructed according to the teachings of the present invention. The disclosed motor 200 has an internal fan 50 constructed and arranged as described above for the motor of FIG. 1. Similarly, the motor includes air inlets 120, outlet 114, and internal flow paths as described above for the motor of FIG. 1. The motor 200 has an external fan 202 essentially identical to those of the prior examples except that it is reverse oriented and moves air from right to left in FIG. 15, or from the drive end 36 to the opposite end 38. In this example, the external fan 202 is housed in a cowl 204 very similar to the cowl 62. However, the cowl has no openings 82 or 90 in the end surface. Air therefore is pulled by the external fan 202 from the case 30 and is forced to exit the cowl 62 via the exhaust opening 88 and passed over the case exterior surface. In each example, the internal and external fans cooperate with one another to move air through the working chamber and share some air flow between them. The motor examples shown herein each provide much improved motor efficiency of prior motor constructions. The air flow and cooling characteristics permit a motor having essentially the same theoretical horsepower rating can produce an actual horsepower output nearly 50% greater than a motor without the dual described fan arrangements.

As will be evident to those of ordinary skill in the art, the various components such as the case, the fans, and the machine components can be altered considerably in configuration and construction and yet fall within the scope of the present invention. Changes and modifications can be made without departing from the scope of the invention. The foregoing detailed description has been given for clearness of understanding only, and no unnecessary limitations should be understood therefrom, as modifications would be obvious to those of ordinary skill in the art.

What is claimed is:

1. A rotary machine comprising:
   a case having an exterior surface exposed to an ambient air, a drive end, an opposite end, and an interior working chamber;
   a rotary shaft supported for rotation within the working chamber between the drive end and the opposite end;
   at least one machine component supported on the rotary shaft for rotation in the working chamber;
   at least one air inlet and at least one air outlet formed in the case;
   a first fan supported for rotation on the rotary shaft within the working chamber and arranged to create an internal air flow through the working chamber from one of the drive or opposite ends of the case to the other of the drive or opposite ends of the case and from the at least one air inlet over the at least one machine component to the at least one air outlet;
   a cowl received over the case opposite end and defining a plenum between an interior surface of the cowl and the opposite end of the case, the cowl defining an annular exhaust opening around a perimeter of the cowl; and
   a second fan positioned within the plenum and mounted for rotation on a portion of the rotary shaft, the second fan being arranged both for assisting the first fan in creating the internal air flow through the working camber and for creating an external air flow through the exhaust opening and over the exterior surface.

2. A rotary machine according to claim 1, wherein the second fan is supported for rotation on a portion of the rotary shaft extending from the case.

3. A rotary machine according to claim 1, further comprising:

a gap between an inner surface of the case and the at least one machine component permitting the internal air flow to pass through the working chamber between the case and the machine component.

4. A rotary machine according to claim 1, further comprising:

a plurality of longitudinal openings provided in portions of the at least one machine component permitting internal air flow to pass through the at least one machine component during operation.

5. A rotary machine according to claim 1, wherein the at least one machine component includes a rotor section and a stator section of an electric motor with the rotor section concentrically carried on the rotary shaft for rotation relative to the stator section.

6. A rotary machine according to claim 1, wherein the cowl further includes at least one air inlet port formed concentric with the rotary shaft for admitting a supply of the ambient air into the plenum, a portion of which is mixed with the external air flow and directed over the exterior surface of the case.

7. A rotary machine according to claim 1, wherein the at least one air inlet is provided through the drive end of the case.

8. A rotary machine according to claim 1, wherein the at least one air inlet is provided through the case near the drive end.

9. A rotary machine according to claim 1, wherein the at least one air outlet is provided through the opposite end of the case.

10. A rotary machine according to claim 1, wherein the at least one air outlet is provided through the case near the opposite end.

11. A rotary machine according to claim 1, further comprising at least one housing extension defining a cavity in communication with the interior working chamber of the case, the cavity having at least one air inlet port and at least one air outlet port defining a longitudinal air flow path through the cavity.

12. A rotary machine according to claim 1, wherein the first fan is arranged for creating the internal air flow from the drive end toward the opposite end of the case and wherein the second fan directs the internal air flow exiting the at least one air outlet toward the exhaust opening of the plenum to create at least a portion of the external air flow.

13. A rotary machine according to claim 1, wherein the first fan is arranged for creating the internal air flow from the opposite end toward the drive end of the case.

14. A rotary machine according to claim 1, further comprising:

a baffle plate positioned between the at least one air inlet and the first fan, the baffle plate having one or more air openings formed therethrough and being arranged to assist in distributing the internal air flow over the interior working chamber near the at least one air inlet.

15. A rotary machine according to claim 1, further comprising:

an inlet chamber in communication with the at least one air inlet, the inlet chamber positioned near the first fan; and a plurality of air passages provided in a wall of the inlet chamber facing the first fan arranged to assist in distributing the internal air flow over the interior working chamber near the first fan.

16. A rotary machine according to claim 1, further comprising:

at least one supplemental air outlet positioned upstream of the at least one air outlet for permitting a portion of the internal air flow through the interior working chamber to exit the case prior to reaching the at least one air outlet.

17. A rotary machine according to claim 1, further comprising a plurality of air inlets.

18. A rotary machine according to claim 1, further comprising a plurality of air outlets.

19. A rotary machine according to claim 1, further comprising:

a baffle flange disposed around a circumference of an interior surface of the working chamber near the first fan.

20. A method of cooling a rotary machine having a case with an exterior surface exposed to a supply of ambient air, a rotary shaft supported within an interior working chamber of the case, and at least one machine component supported for rotation on the rotary shaft within the working chamber, the method comprising the steps of:

providing at least one air inlet and at least one air outlet in fluid communication with the working chamber;

mounting a first fan for rotation on the rotary shaft within the working chamber;

mounting a second fan for rotation on the rotary shaft within a plenum on one end of the machine and exterior to the case;

arranging the first fan to create an internal air flow through the working chamber from one end of the case to an opposite end of the case and from the at least one air inlet and over the at least one machine component to the at least one air outlet; and arranging the second fan both to create an external air flow from the plenum back over the exterior surface of the case and to assist the first fan in creating the internal air flow through the working chamber.

* * * * *

UNITED STATES PATENT AND TRADEMARK OFFICE
CERTIFICATE OF CORRECTION

PATENT NO.   : 6,700,235 B1                                            Page 1 of 1
DATED        : March 2, 2004
INVENTOR(S)  : David D. McAfee It is certified that error appears in the above-identified patent and that said Letters Patent is hereby corrected as shown below:

Column 10,
Line 61, please delete "camber" and replace with -- chamber --.

Column 11,
Lines 9-10, please delete "permitting internal air flow" and replace with -- permitting the internal air flow --.

Signed and Sealed this

First Day of March, 2005

JON W. DUDAS
*Director of the United States Patent and Trademark Office*